United States Patent [19]

Unetich et al.

[11] Patent Number: 5,327,245
[45] Date of Patent: Jul. 5, 1994

[54] METHOD AND APPARATUS FOR COMBINING ADJACENT CHANNEL TELEVISION SIGNALS

[75] Inventors: Robert M. Unetich, Upper St. Clair Township, Allegheny County; Jeffrey M. Lynn, Peters Township, Washington County, both of Pa.

[73] Assignee: Information Transmission Systems Corp., McMurray, Pa.

[21] Appl. No.: 834,166

[22] Filed: Feb. 11, 1992

[51] Int. Cl.⁵ .............................................. H04N 5/38
[52] U.S. Cl. .................................. 348/723; 370/123; 333/135
[58] Field of Search ................ 358/186, 187, 143, 83, 358/167; 370/37, 38, 123; 455/103; 333/126, 135, 127, 134; H04N 5/38

[56] References Cited

U.S. PATENT DOCUMENTS

| | | | |
|---|---|---|---|
| 2,531,447 | 11/1950 | Lewis | 178/44 |
| 2,816,270 | 12/1957 | Lewis | 333/9 |
| 2,897,457 | 7/1959 | Marie | 333/10 |
| 2,936,430 | 5/1960 | Marie | 333/10 |
| 2,939,093 | 5/1960 | Marie | 333/10 |
| 2,999,988 | 9/1961 | Marie | 333/10 |
| 3,428,918 | 2/1969 | Matthaei | 333/6 |
| 3,453,638 | 7/1969 | Hoover | 343/858 |
| 3,461,407 | 8/1969 | Ruggles et al. | 333/6 |
| 3,710,281 | 1/1973 | Thomas | 333/6 |
| 3,806,838 | 4/1974 | Kitazume | 333/6 |
| 3,845,415 | 10/1974 | Ando | 333/6 |
| 3,865,990 | 2/1975 | Kuenemund | 179/15 |
| 3,971,922 | 7/1976 | Bellanger et al. | 235/152 |
| 4,029,902 | 6/1977 | Bell, Jr. et al. | 179/15 |
| 4,129,840 | 12/1978 | Mok | 333/73 |
| 4,258,435 | 3/1981 | Levy et al. | 370/72 |
| 4,291,287 | 9/1981 | Young et al. | 333/210 |
| 4,535,361 | 8/1985 | Lorbel | 358/186 |
| 4,623,921 | 11/1986 | Schmitz et al. | 358/143 |
| 4,652,879 | 3/1987 | Rudish et al. | 342/371 |
| 4,815,075 | 3/1989 | Cameron | 370/123 |
| 4,839,894 | 6/1989 | Rudish et al. | 370/123 |
| 4,847,574 | 7/1989 | Gauthier et al. | 33/21 |

FOREIGN PATENT DOCUMENTS

| | | | |
|---|---|---|---|
| 57-062602 | 4/1982 | Japan | 333/127 |
| 60-062201 | 4/1985 | Japan | 333/134 |

*Primary Examiner*—James J. Groody
*Assistant Examiner*—Safet Metjahic
*Attorney, Agent, or Firm*—Webb, Burden, Ziesenheim & Webb

[57] ABSTRACT

Disclosed is a method and apparatus for combining a plurality of television signal channels which are immediately adjacent in frequency to each other. A main transmission line transmits a plurality of television signals therethrough in a predetermined direction of transmission. The visual signal of a first of the television channels is inserted into the main transmission line in the predetermined direction. The visual signal of a second, immediately adjacent television channel is then inserted into the main transmission line in the predetermined direction, using a frequency band otherwise occupied by the aural signal of the first television channel as a guard band to separate the combined visual signals of the first and second television channels. Each visual signal of the remaining television channels is then sequentially inserted into the main transmission line in the predetermined direction of transmission, using a frequency band otherwise occupied by the aural signal of an immediately adjacent and previously inserted television channel as a guard band to separate the visual signal of each remaining television channel from the previously inserted television channel. The aural signal of the first television channel is then inserted into the main transmission line in the predetermined direction. The aural signal of the second television channel is then inserted into the main transmission line in the predetermined direction. Finally, each aural signal of the remaining television channels is then sequentially inserted into the main transmission line in the predetermined direction of transmission.

26 Claims, 12 Drawing Sheets

METHOD AND APPARATUS FOR COMBINING ADJACENT CHANNEL TELEVISION SIGNALS

BACKGROUND OF THE INVENTION

1. Field Of The Invention

This invention relates to television channel combiners and, more particularly, to arrangements for combining adjacent television channels onto a single transmission line.

2. Description Of The Prior Art

Normal broadcast television signals are a combination of a vestigial side-band, amplitude modulated, bandwidth limited picture or visual signal and a separate, frequency modulated sound or aural signal. The combined visual and aural signals, i.e., the television signal, occupy a particular frequency band which is referred to as a television channel. The frequencies occupied by the visual and aural signals are unique for each separate channel so that the channels remain distinct and maintain their separate information contained therein when the signals are converted in a standard television receiver. Television channels can also be defined as preassigned frequency ranges assigned to the visual and aural signals for a particular transmission. In the usual definition of a range of television channels, the highest frequency assigned to one channel is identical to the lowest frequency assigned to the immediately higher and adjacent channel. Similarly, the lowest frequency assigned to a particular channel is identical to the highest frequency assigned to the immediately lower and adjacent channel.

While commercial television stations often broadcast only a single channel through the air to a user's home, it is also common for cable companies or the like to transmit a plurality of television channels over the air to subscribers. Such wireless cable operations include Multichannel Multipoint Distribution Service (MMDS) systems as well as Instructional Television Fixed Service (ITFS) systems. In one known system operating in the microwave range, thirty-one (31) separate television channels are provided in adjacent six MHz increments, beginning at a frequency of 2500 MHz. In other words, television channel "One" occupies the frequency range of 2500–2506 MHz, channel "Two" occupies the frequency range of 2506–2512 MHz, and so on. Rather than utilize thirty-one (31) separate antennas for each channel, it is common to combine the channels to reduce the amount of transmission equipment used to transmit all channels to subscribers.

In one known arrangement, shown in FIG. 1, alternate television channels are combined in a first system, using the frequency ranges of the omitted channels between each combined channel as protective guard bands. The remaining alternate or non-adjacent television channels are combined in a separate, second system, once again using the frequency ranges of the omitted channels, which are transmitted in the first system, as guard bands. Referring to FIG. 1, a first transmitter 2 for television channel "1", which includes separate video and audio signals, has its output signal coupled to a first non-adjacent channel combiner 4. Similarly, a third transmitter 6 for television channel "3", which likewise includes separate video and audio signals, has its output signal coupled to the first non-adjacent channel combiner 4. Although not shown in FIG. 1, any remaining odd-numbered television channels would also have their output signals coupled to the first non-adjacent channel combiner 4, where all odd-numbered television channels are combined together into a first composite signal. The first composite signal from the first non-adjacent channel combiner 4 is coupled to a first transmission line 8. For a system operating in the microwave frequency range, a length of waveguide would be used for this first transmission line 8. The first transmission line 8 carries the first composite signal from the first combiner 4 to a first transmitting antenna 10. Here, the first composite signal is transmitted through the air to a receiving antenna 12 feeding standard receiving equipment 14.

Similarly, a second transmitter 16 for television channel "2" has its video and audio output signals coupled to a second non-adjacent channel combiner 18 and a fourth transmitter 20 for television channel "4" has its video and audio output signals coupled to tee second non-adjacent channel combiner 18. Any remaining even-numbered television channels would also have their output signals coupled to the second non-adjacent channel combiner 18 where all even-numbered television channels are combined together to form a second composite signal. A second transmission line 22 carries the second composite signal from the second combiner 18 to a second transmitting antenna 24, where the second composite signal is transmitted through the air to the receiving antenna 12.

The output signals from the various channel transmitters, for a microwave system, would be coupled to the channel combiners by multi-section directional filters or the like. FIG. 2 shows a typical response for one channel of a three section filter used in coupling the visual and aural signals for that channel to a non-adjacent channel combiner. The response includes most of the usable information in the six MHz frequency range of the channel itself, otherwise referred to as the occupied channel. The response begins to drop off in the upper and lower adjacent channels and significantly drops off to negligible levels in the first upper non-adjacent channel and the first lower non-adjacent channel. FIG. 3 shows the typical response of a non-adjacent four channel combiner which uses the omitted channels as guard bands to separate the channels from each other.

The FIG. 1 arrangement requires two separate channel combiners, two separate waveguide transmission lines and two separate transmitting antennas to transmit the plurality of television channels to a single receiving antenna 12. This duplication of equipment substantially increases the cost of the overall system, particularly when very expensive waveguides are used for the transmission lines in systems operating in the microwave range of frequencies.

There exists in the art a need for channel combiners which can combine immediately adjacent television channels, if only to reduce this expensive duplication of transmission equipment.

A number of prior art adjacent channel combiners have been proposed to avoid the duplication inherent in dual transmission line systems. These include the arrangements shown in U.S. Pat. Nos. 2,531,447; 4,029,902; 4,258,435; 4,815,075 and 4,839,894. Other prior art known to the applicants which is relevant to this field include U.S. Pat. Nos. 2,816,270; 3,428,918; 3,453,638; 3,461,407; 3,710,281; 3,806,838; 3,865,990; 3,971,922; 4,652,879 and 4,847,574. These prior art arrangements employ complex hybrid combining methods that are either expensive or difficult to build or maintain, or introduce signal loss, or both.

In order to overcome the disadvantages of the prior art, it is an object of the present invention to provide an arrangement for combining a plurality of adjacent television channels onto a single transmission line without increasing hardware requirements and without serious degradation of signal parameters or power.

SUMMARY OF THE INVENTION

Accordingly, we have developed a method and apparatus for combining a plurality of television signal channels which are immediately adjacent in frequency to each other, with each of the channels including a visual signal and a separate aural signal. In accordance with our invention, we provide a main transmission line adapted to transmit a plurality of television signals therethrough in a predetermined direction of transmission. We then insert the visual signal of a first of the television channels into the main transmission line in the predetermined direction. We then insert the visual signal of a second, immediately adjacent television channel into the main transmission line in the predetermined direction, using a frequency band otherwise occupied by the aural signal of the first television channel as a guard band to separate the combined visual signals of the first and second television channels. We then sequentially insert each visual signal of the remaining television channels into the main transmission line in the predetermined direction of transmission, using a frequency band otherwise occupied by the aural signal of an immediately adjacent and previously inserted television channel as a guard band to separate the visual signal of each remaining television channel from the previously inserted television channel. We then insert the aural signal of the first television channel into the main transmission line in the predetermined direction, then insert the aural signal of the second television channel into the main transmission line in the predetermined direction, and then sequentially insert each aural signal of the remaining television channels into the main transmission line in the predetermined direction of transmission.

The visual signals can be inserted into the transmission line by a plurality of visual directional filters which are each connected to the main transmission line and which are each adapted to transmit only the visual signal of a particular television channel therethrough. For example, a first visual directional filter is adapted to transmit only the visual signal of a first television channel and a second visual directional filter, positioned immediately downstream of the first visual directional filter with respect to the predetermined direction of transmission, is adapted to transmit only the visual signal of a second television channel immediately adjacent to the first television channel. In addition, the arrangement can include a plurality of aural directional filters, equal in number to the plurality of visual directional filters, in which are each connected to the main transmission line at locations downstream of the visual directional filters. Each of the aural directional filters are adapted to transmit only the aural signal of a particular television channel through the main transmission line in the predetermined direction of transmission. For example, a first aural directional filter is adapted to transmit only the aural signal of the first television channel and a second aural directional filter, positioned immediately downstream of the first aural directional filter with respect to the predetermined direction of transmission, is adapted to transmit only the aural signal of the second television channel. In a preferred arrangement, each television channel transmitted through the main transmission line is the adjacent television channel next higher in frequency than an immediately preceding television channel.

This arrangement is particularly suited for transmitting microwave frequency television signals. In such an arrangement, the main transmission line is a length of main waveguide, such as an elongated, rectangular waveguide. Each visual and aural directional filter includes a cylindrical waveguide filter connected at one end to the main waveguide and a directional coupler connected to an opposite end of the cylindrical waveguide filter. In addition, the main transmission line can be formed of a first main waveguide having each of the visual directional filters attached thereto and a second main waveguide, connected to the first main waveguide, and having each of the aural directional filters attached thereto.

DESCRIPTION OF THE PREFERRED EMBODIMENTS

The present invention can take many forms and configurations. It can be embodied in microwave waveguide elements, coaxial cables, lumped elements or the like. In addition, the invention can readily be embodied in a minimum of two adjacent television channels to be combined, or can be used to combine a plurality of such channels. All embodiments of the present invention utilize the same basic principles. This invention uses the frequency division multiplex nature of television signals and treats the visual signal in a particular television channel separately from its accompanying aural signal. The invention provides for the sequential combining, onto a transmission line, of all visual television signals of a plurality of adjacent channels prior to combining all aural signals onto the transmission line. This technique allows the use of filters that pass specific visual signals, reject that channel's aural signal, and reject adjacent channel visual and aural signals. This is accomplished by using the vacant frequency spectrum normally occupied by the aural signal of the various television channels as protective guard bands. After the visual signals for each television channel have been combined onto the common transmission line, the aural signals are sequentially added in separately with narrow band filters that easily reject all of the visual signals. As a result, the present invention can develop a single output signal delivering multiple adjacent television channels, i.e., immediately adjacent in frequency, to a single antenna system.

Figure 1:
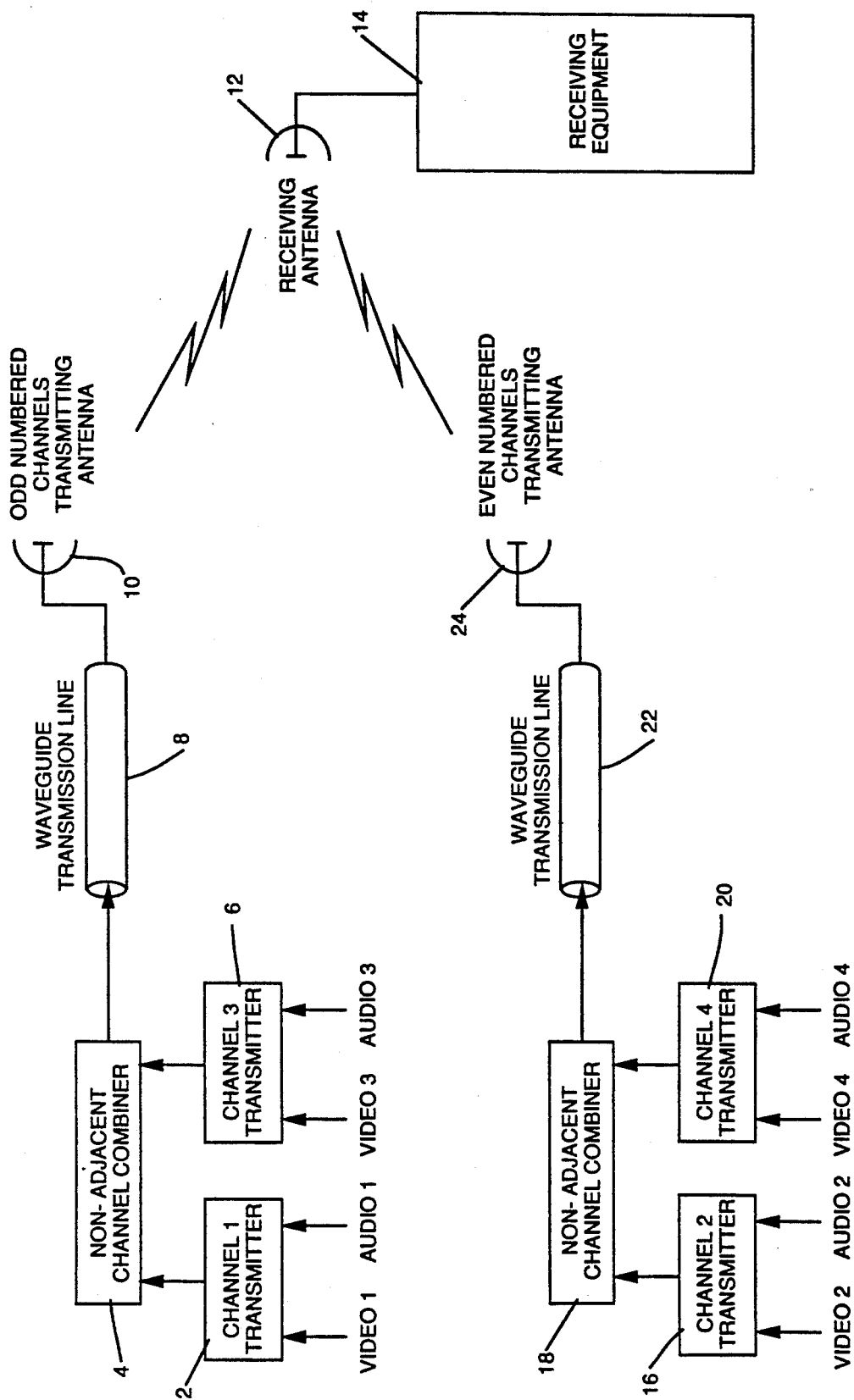
FIG. 1 is a block diagram of a prior art transmission system using a pair of non-adjacent channel combiners.
Figure 2:
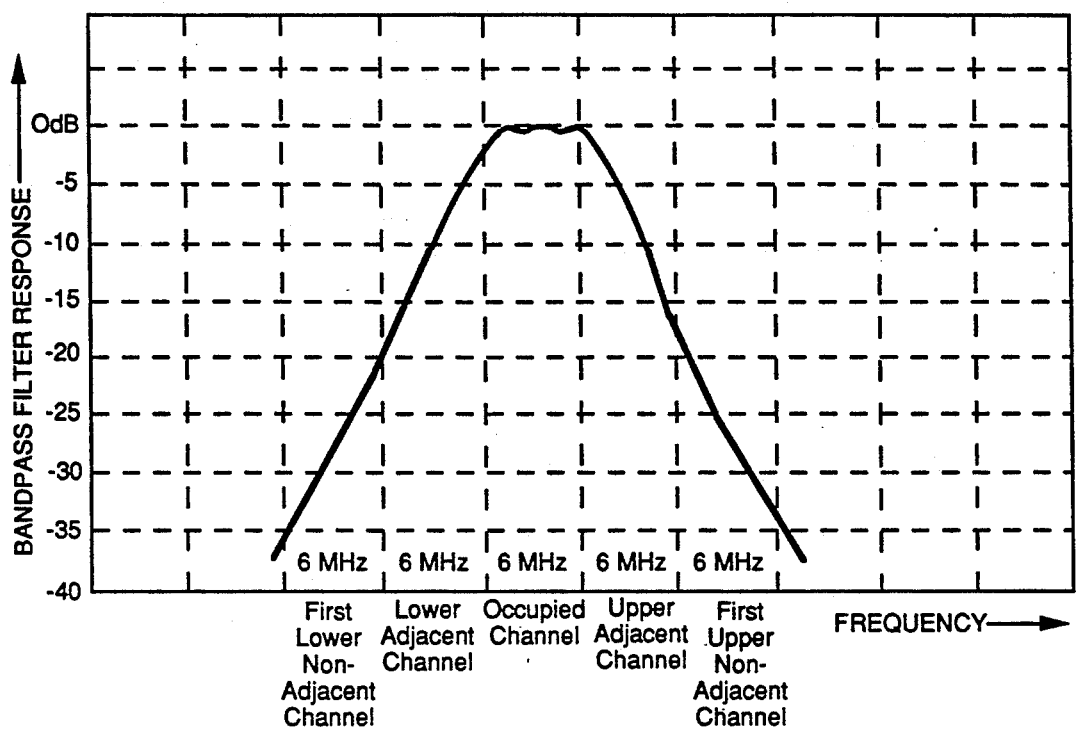
FIG. 2 is the filter response of a non-adjacent television channel combiner.
Figure 3:
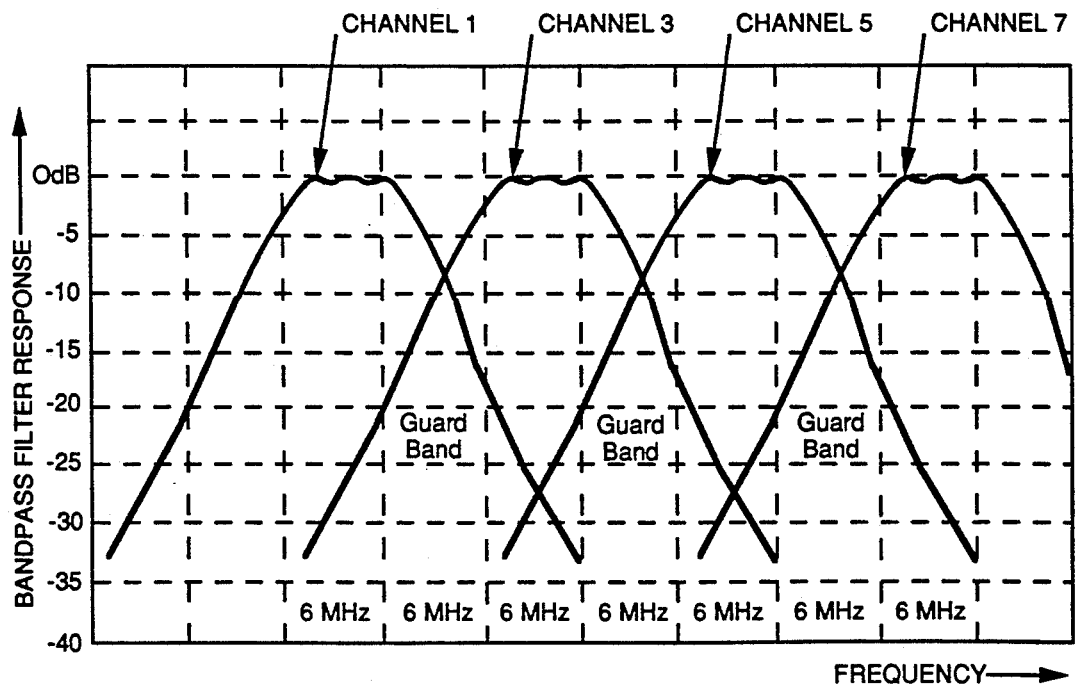
FIG. 3 is the response of a non-adjacent four channel combiner.
Figure 4:
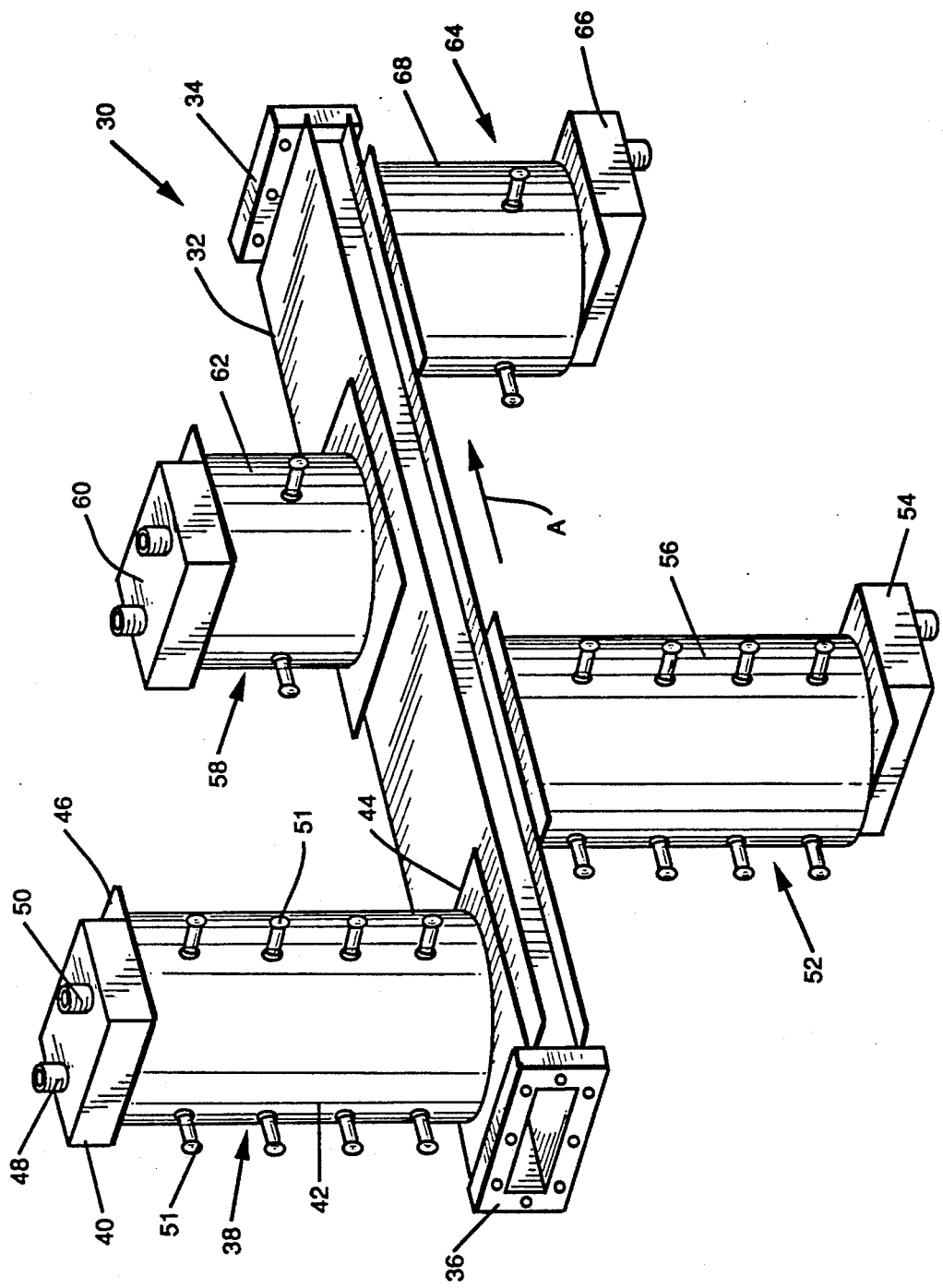
FIG. 4 is a perspective view of a two channel adjacent television channel combiner in accordance with the present invention.

The simplest embodiment of an adjacent television channel combiner, in accordance with the present invention, i.e., a two channel combiner 30, is shown in FIG. 4. This embodiment shows a waveguide based arrangement used in combining frequencies in the microwave range. A main transmission line for the combiner is formed from an elongated, rectangular main waveguide 32. The opposite open ends of the main waveguide 32 carry flanges 34, 36 so that the two channel combiner 30 can be joined to other transmission elements in a total system. The main waveguide 32 is, as is known in the art, capable of transmitting electromagnetic radiation associated with television signals therethrough along a predetermined direction of transmission. This predetermined direction of transmission is shown by arrow A in FIG. 4.

In accordance with the present invention, the two channel combiner 30 includes a first visual directional filter 38 connected to the main waveguide 32 near the upstream end adjacent flange 36. The first visual directional filter 38 includes a rectangular waveguide or first visual directional coupler 40 attached to an upper end of a four pole or section first visual cylindrical waveguide filter 42 which, in turn, is connected at a lower end thereof to the main waveguide 32. A first support plate 44 can be provided between the main waveguide 32 and the first visual cylindrical waveguide filter 42 and a second support plate 46 can be provided between the first visual cylindrical waveguide filter 42 and the first visual directional coupler 40. The first visual directional coupler 40 has an input port 48 and a terminate port 50, both in the form of threaded coaxial connectors extending through the first visual directional coupler 40. The coaxial connectors forming the input and terminate ports 48, 50 each have a radiating antenna at their end inside the first visual directional coupler 40.

The first visual cylindrical waveguide filter 42 has a plurality of plates or disks therein with holes therethrough which divide the first visual cylindrical waveguide filter 42 into sections spaced approximately one-half wavelength of the desired filter response of the first visual directional filter 38. For example, the four section first visual cylindrical waveguide filter 42 shown in FIG. 4 would have three such plates therein. A plurality of tuning screws 51 are provided for each section. A first coupling aperture is formed between the first visual directional coupler 40 and the first visual cylindrical waveguide filter 42 and a second coupling aperture is formed between the first visual cylindrical waveguide filter 42 and the main waveguide 32. These coupling apertures are not shown in the drawings, as they are internal to the first visual directional filter 38, but are located off center in such a way that a signal entering the first visual directional coupler 40 excites a circularly polarized wave in the cavity of the first visual cylindrical waveguide filter 42 and, conversely, a circularly polarized wave in the first visual cylindrical waveguide filter 42 produces a directional traveling wave in the main waveguide 32 along the predetermined direction of transmission A. At the resonant frequency of the first visual cylindrical waveguide filter 42, all of the energy is coupled from the waveguide of the first visual directional coupler 40 to the main waveguide 32. The first visual directional filter 38 may be considered as a directional coupler in which the coupling is a function of frequency. Basically, there is unity coupling at the resonant frequency and effectively zero coupling at frequencies removed from resonance.

The construction and operation of directional filters, and the design requirements for predetermined frequency responses, are well known in the prior art as shown in, for example, U.S. Pat. Nos. 2,897,457; 2,936,430; 2,939,093; 2,999,988; 3,845,415; 4,129,840 and 4,291,287, the disclosures of which are incorporated herein by reference. The present invention is not directed to directional filters per se, but to the use of directional filters in a specific combining arrangement.

A second visual directional filter 52 is connected to the main waveguide 32 at a location immediately downstream of the first visual directional filter 38 with respect to the predetermined direction of transmission A. The second visual directional filter 52 includes a second visual directional coupler 54 attached to a second visual cylindrical waveguide filter 56 which, in turn, is connected to the main waveguide 32. The second visual directional filter 52 is similar in operation and construction to the first visual directional filter 38, but is tuned to respond to the visual television signal of a channel immediately adjacent in frequency to the channel transmitted, in part, through the first visual directional filter 38.

A first aural directional filter 58 is connected to the main waveguide 32 at a location downstream of the visual directional filters 38, 52 with respect to the predetermined direction of transmission A. The first aural directional filter 58 is similar in construction and operation to the visual directional filters 38, 52 and includes a first aural directional coupler 60 connected to a first aural cylindrical waveguide filter 62. Finally, a second aural directional filter 64 is connected to the main waveguide 32 at a location downstream of the first aural directional filter 58 with respect to the predetermined direction of transmission A. Likewise, the second aural directional filter 64 includes a second aural directional coupler 66 connected to a second aural cylindrical waveguide filter 68. The first and second aural directional filters 58 and 64 are tuned to the aural signal accompanying the visual signals transmitted in the first and second visual directional filters 38 and 52, respectively. The aural directional filters 58, 64 are shown in FIG. 4 as including single section cylindrical waveguide filters 62, 68 since no greater or more precise or selective filtering is needed for the small band width of the aural signals. In other words, the visual directional filters 38, 52 generally need multi-section cylindrical waveguide filters, while the aural directional filters 58, 64 can operate in a satisfactory manner with single section cylindrical waveguide filters.

Each of the visual directional filters 38, 52 are designed, by well-known techniques, to pass the visual signal of a particular television channel and reject the aural signal of the same television channel as well as reject the visual and aural signals of the other channel. Similarly, the aural directional filters 58, 64 are designed to pass the aural signal of a particular television channel and reject the visual signal of that channel as well as the visual and aural signal of the other channel. For example, each four section visual cylindrical waveguide filter shown in FIG. 4 can be designed easily with sufficient band width to pass the entire visual signal and sufficient roll-off to reject to the other channel signal, except for perhaps about 10% of the energy of the upper range of the television channel. Since a television signal is normally a vestigial side-band signal, the energy of the upper end of the channel is of little importance relative to the high power carrier at the lower end of the channel and will only be a minor impairment of performance. The single section aural cylindrical waveguide filters can be easily designed to pass the narrow bandwidth signal associated with the aural signals and reject the energy of the visual signals of the two channels. While the aural directional filters may have some response at the upper end of the visual signal band, and, therefore, cause some attenuation of the related channel information, this is a normal characteristic of television signal diplexers and can be easily compensated for by high frequency response and delay adjustment of the originating television signal.

Therefore, it can be summarized that the first visual directional filter 38 is adapted to transmit only the visual signal of a first television channel through the main transmission line or waveguide 32 in the predetermined direction of transmission A. Similarly, the second visual directional filter 52 is adapted to transmit the only visual signal of a second television channel through the main waveguide 32 in the predetermined direction of transmission A. The second television channel is immediately adjacent in frequency to the first television channel, preferably the adjacent television channel next higher in frequency than the first television channel. Similarly, the first aural directional filter 58 is adapted to transmit only the aural signal of the first television channel through the main waveguide 32 in the predetermined direction of transmission A. Finally, the second aural directional filter 64 is adapted to transmit the only aural signal of the second television channel through the main waveguide 32 in the predetermined direction of transmission A.

Figure 5:
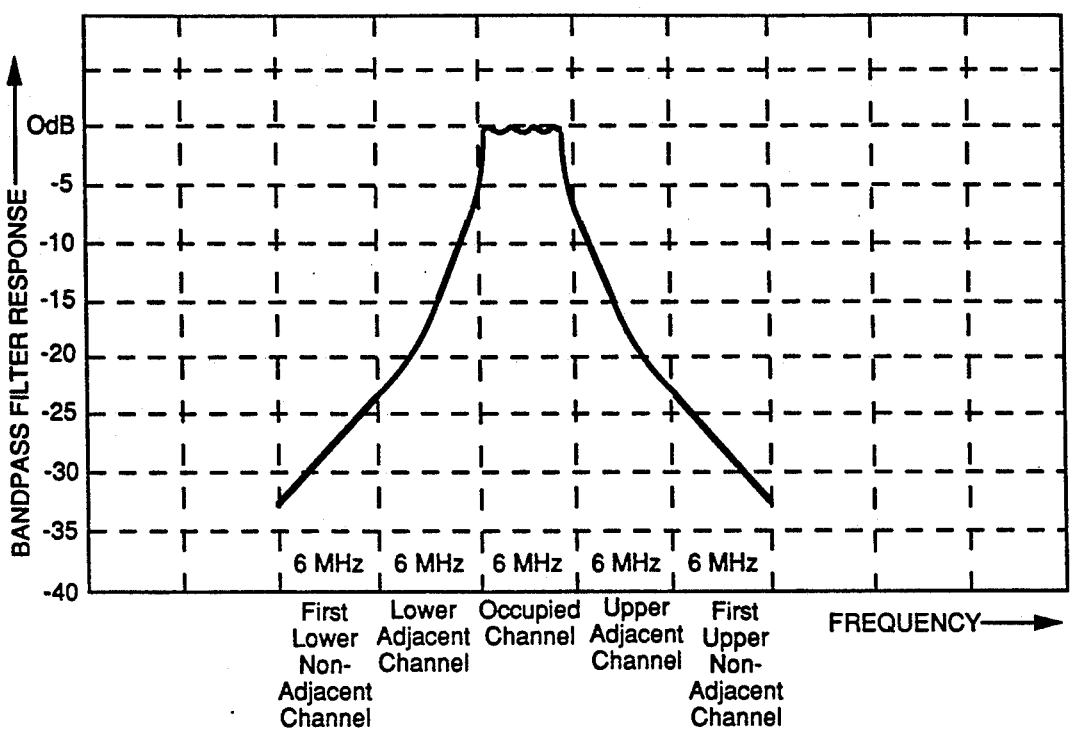
FIG. 5 is the visual filter response of the adjacent television channel combiner shown in FIG. 4.
Figure 6:
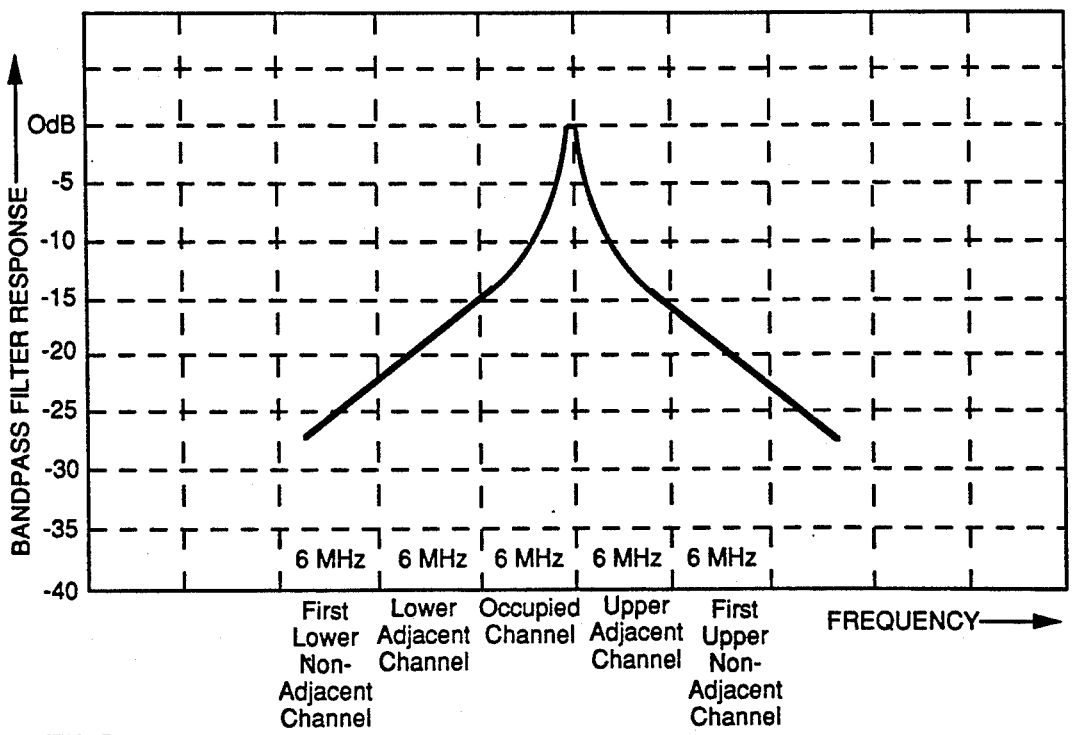
FIG. 6 is the aural filter response of the adjacent television channel combiner shown in FIG. 4.
Figure 7:
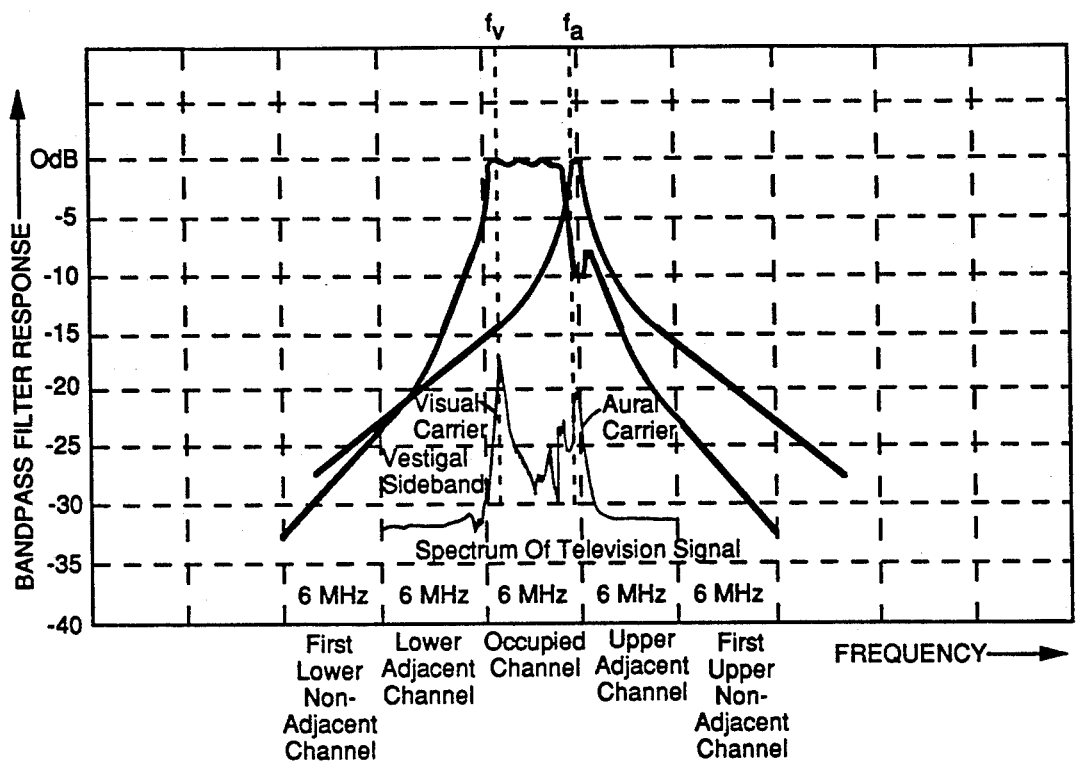
FIG. 7 is the combined visual and aural response of the adjacent television channel combiner shown in FIG. 4.

The nature and operation of the combining actions taking place in the two channel combiner 30 shown in FIG. 4 are illustrated in connection with FIGS. 5–9. FIG. 5 shows a typical response of a four section visual directional filter 38, 52. Assuming that the television channel in question occupies a 6 MHz frequency range, the visual filter response will be at approximately 0 dB throughout substantially all of the channel range, with the exception of a small portion near the upper adjacent channel. The response trails off dramatically in the upper and lower adjacent channels and trails off even more significantly in the first upper non-adjacent channel and the first lower non-adjacent channel. A typical response of a one section aural directional filter 58, 64 is shown in FIG. 6. Essentially, the spike signal peaking at the 0 dB level of the aural signal occupies nearly all of the remaining 6 MHz range in the occupied channel not otherwise occupied by the visual signal and trails off dramatically in the upper and lower adjacent channels and in the first lower non-adjacent channel and first upper non-adjacent channel. This is more clearly shown in FIG. 7 which shows a typical combined response of a single television channel with both the visual and aural signals of FIGS. 5 and 6 superimposed on one another. The visual signal is characterized as having a carrier frequency $f_v$ near the lower end of the 6 MHz occupied channel while the aural signal is characterized by a carrier frequency $f_a$ near the upper range of the 6 MHz occupied channel. The combined response of the visual and aural directional filters are shown in FIG. 7 in comparison to the spectrum of the television signal which is transmitted from a combination of these directional filters.

Figure 8:
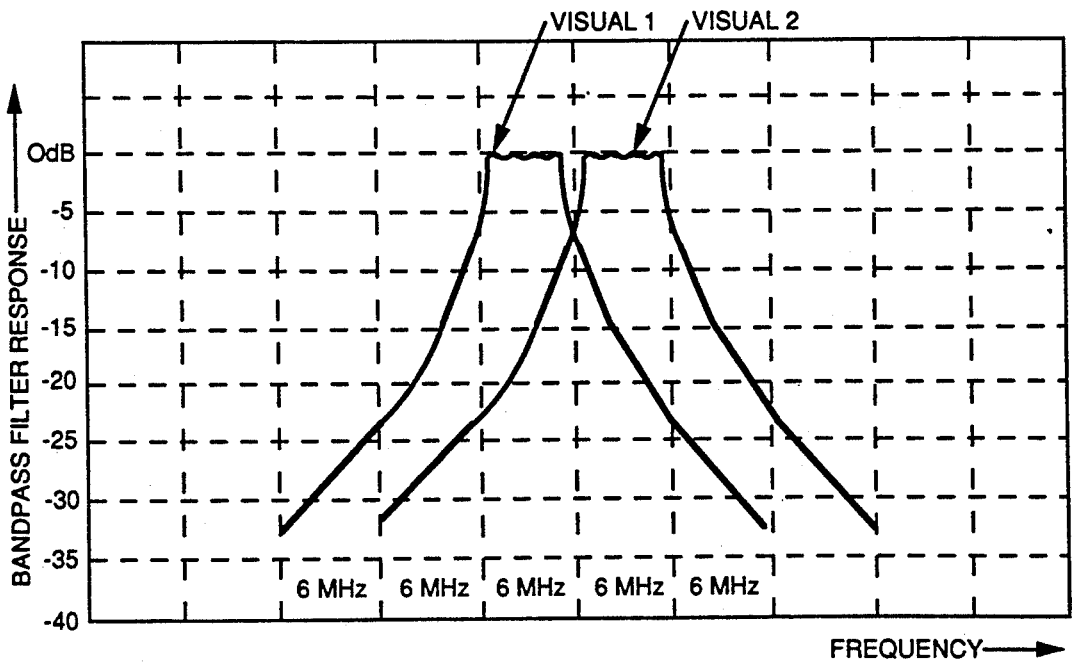
FIG. 8 is the combined response of the two visual filters in the adjacent television channel combiner shown in FIG. 4.
Figure 9:
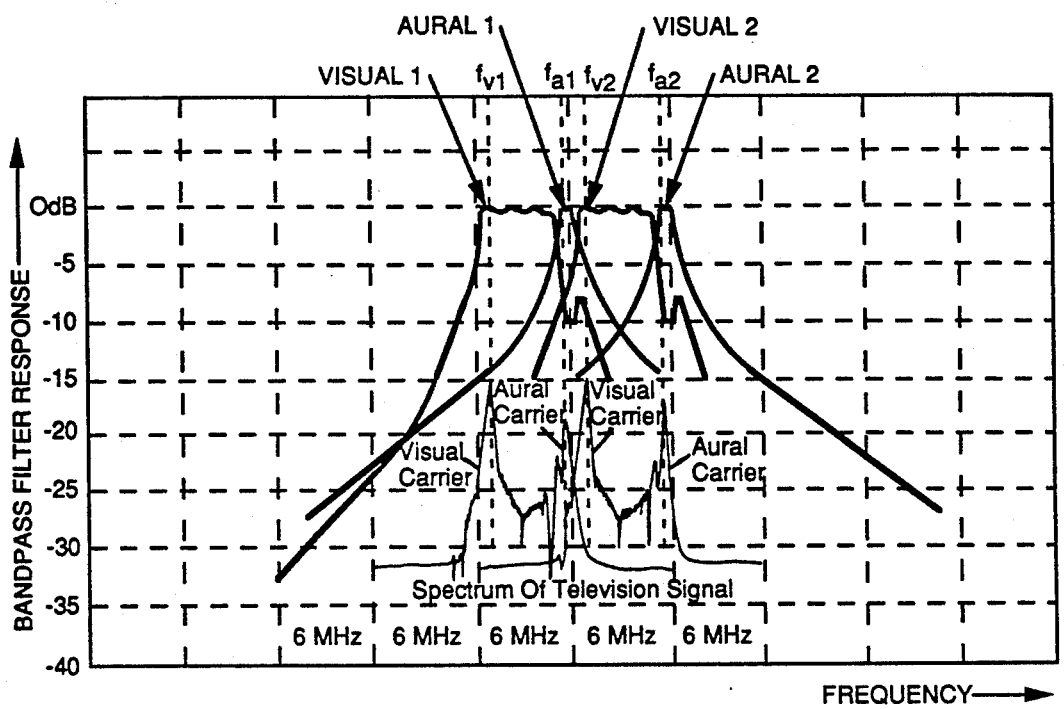
FIG. 9 is the complete response of the two channel adjacent television channel combiner shown in FIG. 4.

In accordance with the present invention and in conjunction with the two channel combiner 30 shown in FIG. 4, the visual signal of a first television channel is directionally coupled into the main waveguide 32 through the first visual directional filter 38. Then the visual signal of a second, adjacent television channel is directionally coupled into the main waveguide 32 through the second visual directional filter 52. The response of the combination of the visual signals for the two adjacent channels is shown in FIG. 8. It can be seen that a small frequency space is left between the first visual signal and the second visual signal when only the visual signals of the two television channels are initially combined into the main waveguide 32. This frequency spectrum is made available because the aural signal otherwise associated with the first television channel has not yet been combined into the main waveguide 32. This frequency space forms a guard band between the two visual signals of the adjacent television channels and maintains a separation therebetween. After the visual signals for the two channels have been combined in the main waveguide 32, the aural signal associated with the first channel is directionally coupled into the main waveguide 32 through the first aural directional filter 58. Then the aural signal associated with the second, adjacent channel is directionally coupled into the main waveguide 32 through the second aural directional filter 64. The combined response of both visual signals and both aural signals for the two channel adjacent channel combiner 30 shown in FIG. 4 is shown in FIG. 9. The responses of all four directional filters are shown in conjunction with the spectrum of the combined television output signal which would be transmitted by the two channel combiner 30 downstream of the second aural directional filter 64. As a net result, the two channel combiner 30 produces an output signal representing the combined visual and aural outputs of the two television channels, yet maintains the separate signals contained therein.

The same basic principles applied in developing the two channel combiner 30 of FIG. 4 can also be applied to combine any number of adjacent television channels together. Essentially, a multi-channel combiner includes a main transmission line which is adapted to transmit a plurality of television signals therethrough in a predetermined direction of transmission. The multi-channel combiner also includes a plurality of visual directional filters which are each connected to the main transmission line and are each adapted to transmit only the visual signal of a particular television channel through the main transmission line in the predetermined direction of transmission. A first visual directional filter transmits only the visual signal of a first television channel. A second visual directional filter, positioned immediately downstream of the first visual directional filter, transmits only the visual signal of a second television channel immediately adjacent in frequency to the first television signal. Similarly, each of the remaining visual directional filters are positioned immediately downstream of an immediately preceding visual directional filter and are adapted to transmit only the visual signal of the next television channel immediately adjacent in frequency to the television channel associated with the immediately preceding visual directional filter. A plurality of aural directional filters, equal in number to the plurality of visual directional filters, are connected to the main transmission line at locations downstream of the visual directional filters. Each aural directional filter is adapted to transmit only the aural signal of a particular television channel through the main transmission line in the predetermined direction of transmission. Specifically, a first aural directional filter transmits only the aural signal of the first television channel. A second aural directional filter, positioned immediately downstream of the first aural directional filter, transmits only the aural signal of a second television channel. Each of the remaining aural directional filters are positioned immediately downstream of an immediately preceding aural directional filter and transmit only the aural signal of the next television channel immediately adjacent to the television channel associated with the immediately preceding aural directional filter.

Figure 10:
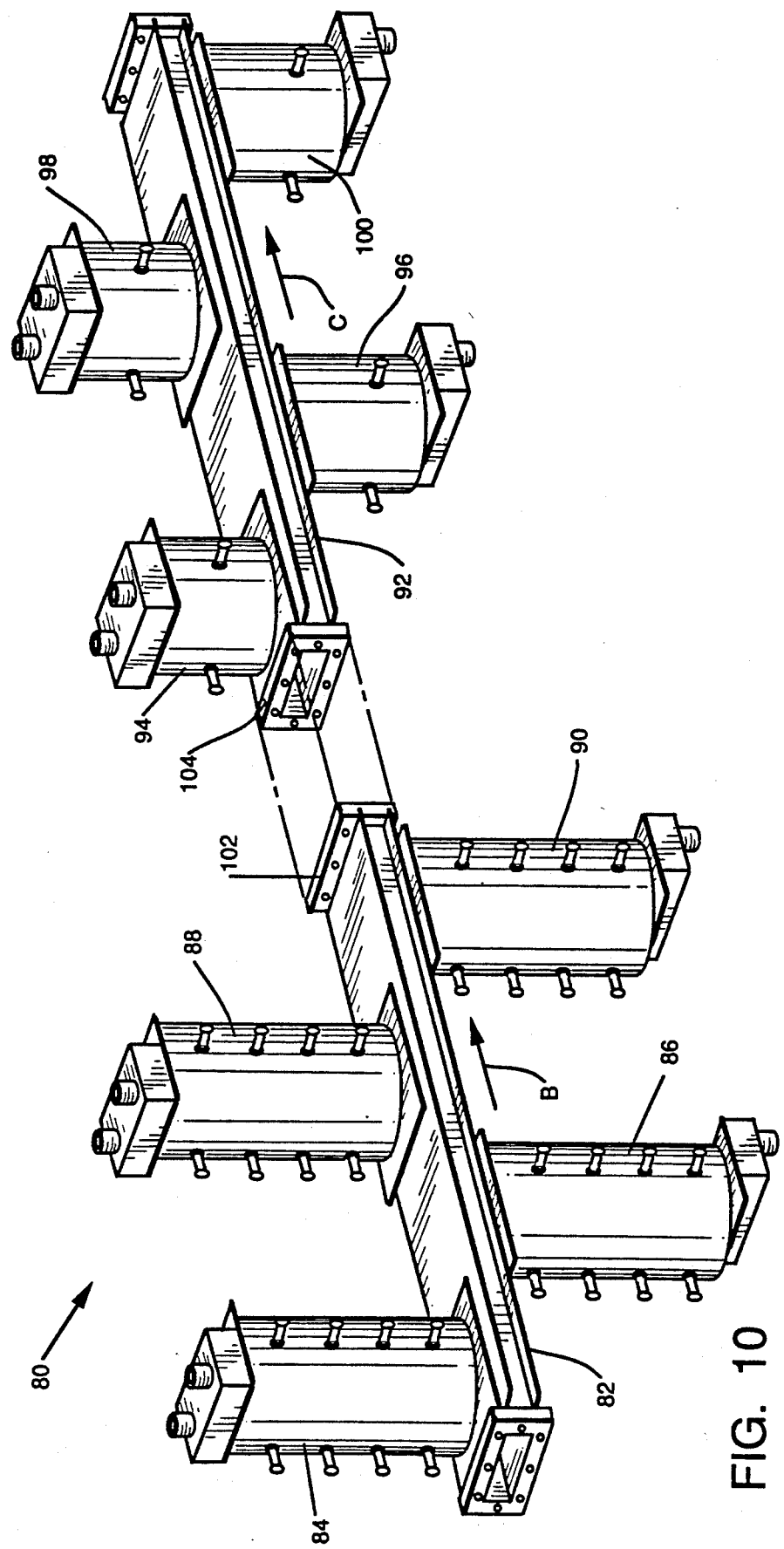
FIG. 10 is a perspective view of a four channel adjacent television channel combiner in accordance with the present invention.

An embodiment of the present invention suitable for combining four adjacent television channels is shown in FIG. 10. FIG. 10 also shows the possibility of providing a modular arrangement which includes a divided main waveguide. The four channel combiner 80 includes a first main waveguide 82 having attached thereto, in turn, a first visual directional filter 84, a second visual directional filter 86, a third visual directional filter 88 and a fourth visual directional filter 90. Similarly, a second main waveguide 92 has attached thereto, in turn, a first aural directional filter 94, a second aural directional filter 96, a third aural directional filter 98 and a fourth aural directional filter 100. The directions of flow of transmitted signals through the first and second main waveguides 82, 92 are shown by arrows B and C, respectively, in FIG. 10. In normal operation, the downstream end or outlet opening of the first main waveguide 82 is connected by flange 102 to a flange 104 at the inlet or upstream opening of the second main waveguide 92.

Figure 11:
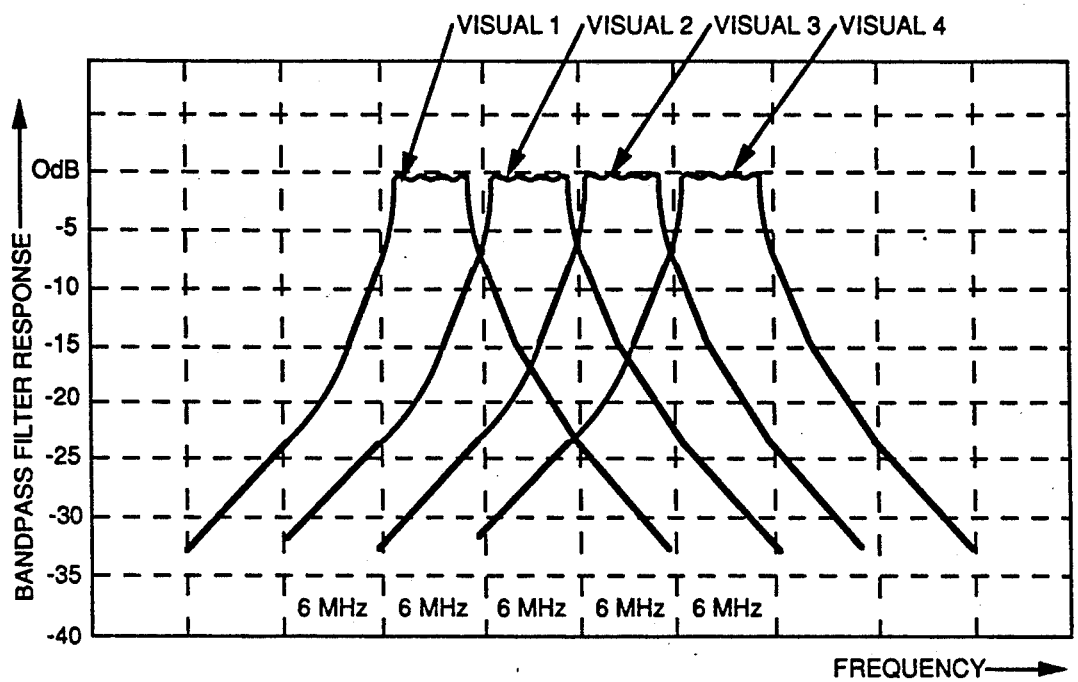
FIG. 11 is the combined response of four visual filters in the adjacent television channel combiner shown in FIG. 10.
Figure 12:
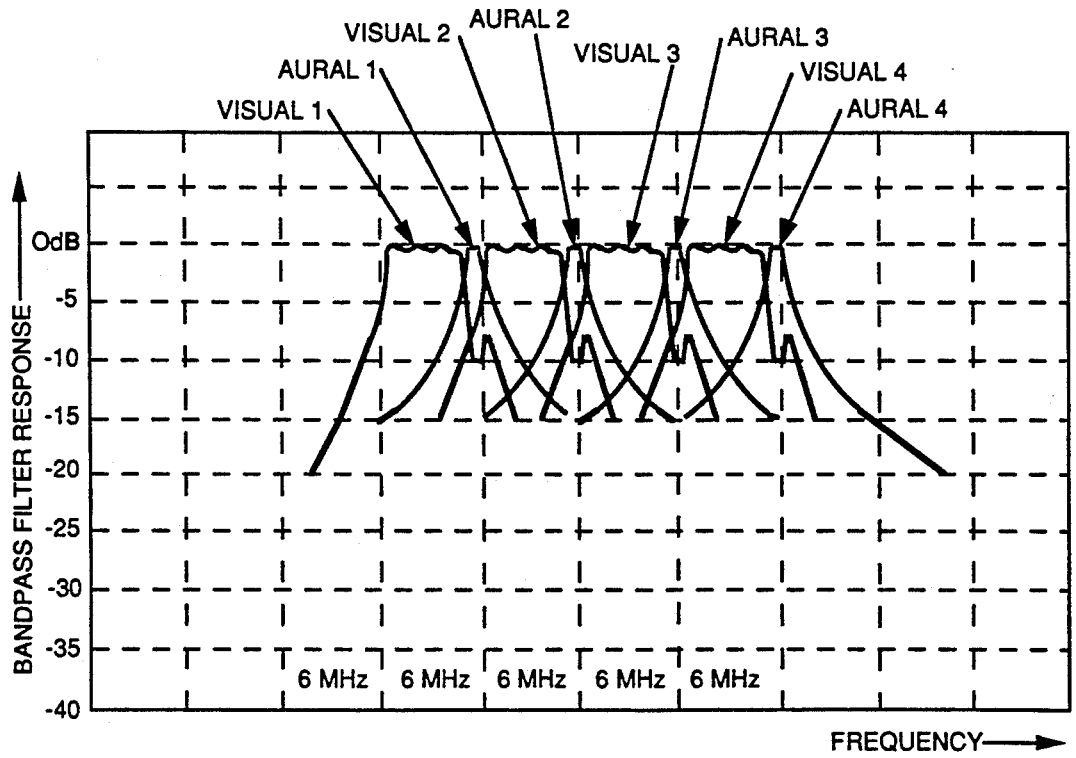
FIG. 12 is a complete response of the four channel adjacent television channel combiner shown in FIG. 10.

The response and operation of the visual and aural directional filters and main waveguides in the four channel combiner 80 shown in FIG. 10 are identical to that described above in connection with FIG. 4, except that four visual signals for the four television channels are sequentially combined together in the first main waveguide 82 before the four aural signals associated with the four television signals are sequentially added to the combined visual signals in the second main waveguide. This operation is illustrated in FIGS. 11 and 12. FIG. 11 shows the combined response of the four visual directional filters and shows the spacing, from the omitted aural signals, between adjacent visual signals which function as protective guard bands separating the visual signals. FIG. 12 shows the combined response of all four visual and aural directional filters in the four channel combiner 80 shown in FIG. 10.

A prototype of a waveguide-based, microwave frequency two adjacent television channel combiner was built in accordance with the two channel combiner 30 shown in FIG. 4. The main waveguide 32, visual directional filters 38, 52 and aural directional filters 58, 64 of the two channel combiner 30 were designed to carry microwave channels C1 and D1 defined as follows: Channel C1 has a frequency range of 2548-2554 MHz, a visual carrier frequency of 2549.250 MHz and an aural carrier frequency of 2553.750 MHz. Channel D1 has a frequency range of 2554-2560 MHz, a visual carrier of 2555.250 MHz and an aural carrier frequency of 2559.75 MHz.

The main waveguide 32 was a twenty-two inch length of standard WR-340 rectangular waveguide with flanged ends. The visual directional filters 38, 52 used three section cylindrical waveguide filters and the aural directional filters 58, 64 used single section cylindrical waveguide filters. Each visual cylindrical waveguide filter 42, 56 was a three section critically coupled Chebyshev response with a 1 dB bandwidth of approximately 5 mhz. The response was adjusted on each of the two selected channels C1 and D1 to ensure that the energy between the visual carrier and 4.2 mhz above the visual carrier passed through the filter with a flat response. The three section critically coupled Chebyshev response was selected to provide a substantial amount of rejection of the adjacent channel visual signal. Each aural cylindrical waveguide filter 62, 68 was a single section filter of standard Gaussian shaped response having a bandwidth in the normal range for aural service, about 250 kilohertz at the 1 dB points. The bandwidth and response shape of these visual and aural filters were achieved using known techniques to select the input, output and interstage coupling holes or apertures. These holes were initially calculated using standard waveguide design formulas and then optimized through an empirical adjustment to achieve the desired characteristics. The loss in the visual filters was less than 1 dB across the pass band between the visual carrier and 4.2 mhz above the visual carrier. The loss at the aural carrier frequency was approximately 2 dB. The visual and aural directional filters were attached to the main waveguide with standard hardware. The apertures in the directional couplers were substantially larger than the input and output coupling holes of the cylindrical waveguide filters. This resulted in the input and output coupling being established by the cylindrical waveguide filters instead of by the holes in the directional couplers. The cylindrical waveguide filters were tuned using standard sweep test equipment. Initially, the visual filters were tuned to achieve the desired characteristics on channels C1 and D1. Then the aural filters were tuned into the channels.

Figure 13:
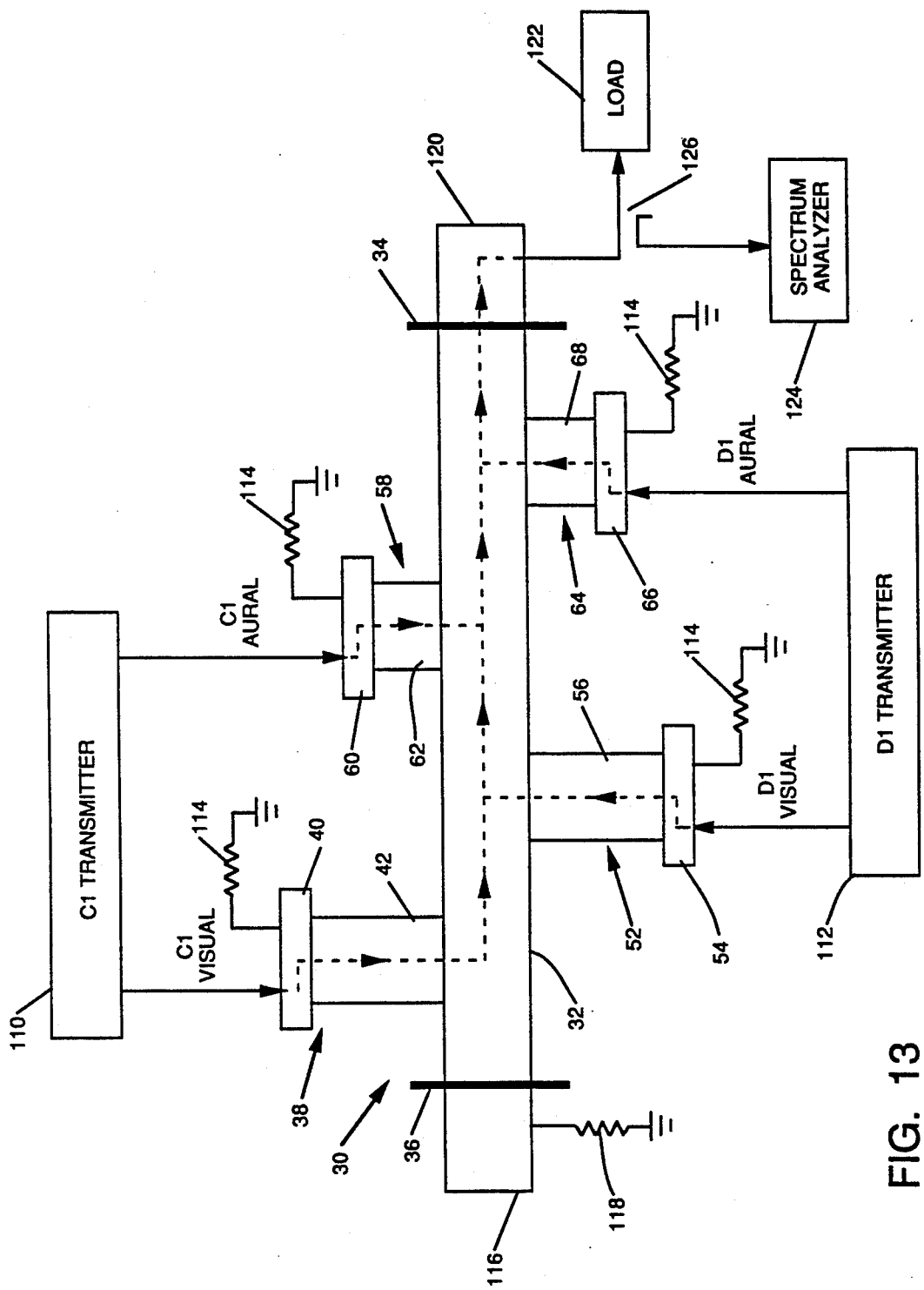
FIG. 13 is a schematic diagram of an arrangement used in testing a prototype of the two channel adjacent television channel combiner shown in FIG. 4.

This two channel combiner 30 was tested using the arrangement shown in FIG. 13. A C1 transmitter 110 had its visual and aural outputs connected to the input ports of the first visual directional filter 38 and first aural directional filter 58, respectively. Similarly, a channel D1 transmitter 112 had its visual and aural outputs connected to the second visual directional filter 52 and second aural directional filter 64, respectively. The terminate ports of the visual and aural directional filters were each grounded through separate loading resistors 114. The input opening of the main waveguide 32 was covered by a cap 116 connected to flange 36 and terminated to ground by a standard 50 ohm loading resistor 118 to absorb any residual power exiting the input opening. Finally, the output opening of the main waveguide 32 was covered by an output adapter 120 connected to flange 34 and connected by a coaxial directional coupler to an appropriate dummy load 122 capable of absorbing the transmitter output power. A spectrum analyzer 124 sampled the output spectrum generated by the two channel combiner 30 through a directional sampler 126.

The dotted lines and arrows in the main waveguide 32 and visual and aural directional filters 38, 52, 58 and 64 show how the visual signals, in turn, and then the aural signals, in turn, for channels C1 and D1 are sequentially and directionally coupled into the main waveguide 32 and transmitted to an outlet end of the two channel combiner 30.

Figure 20:
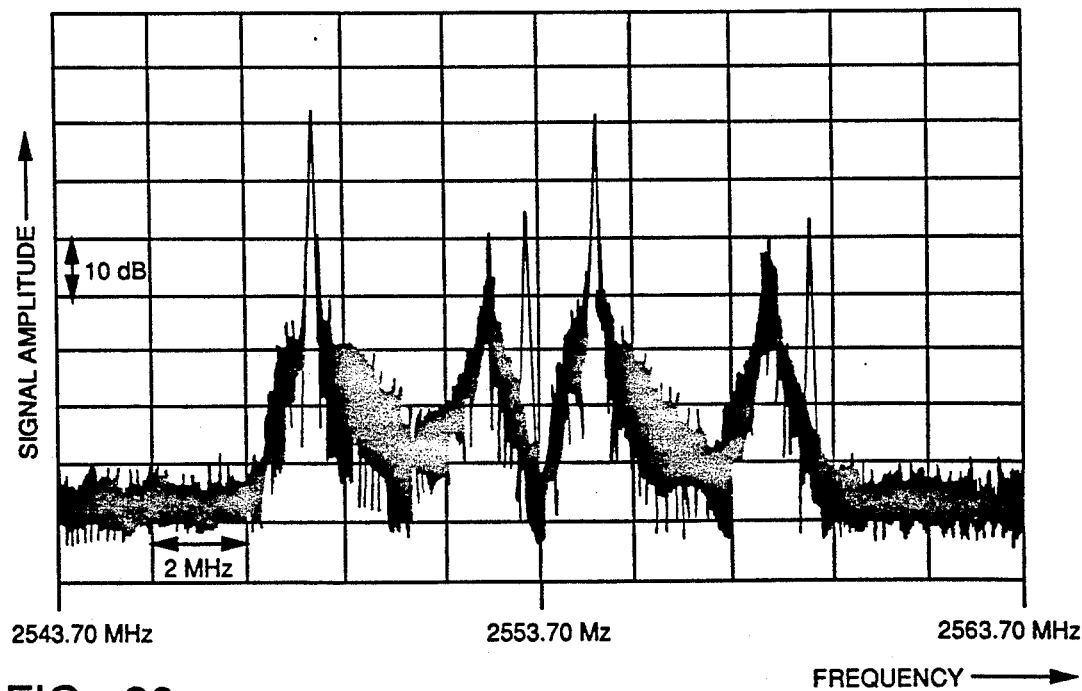
FIG. 20 is the spectrum response of the combined visual and aural outputs for both adjacent channels of the adjacent channel television combiner shown in FIG. 13.
Figure 14:
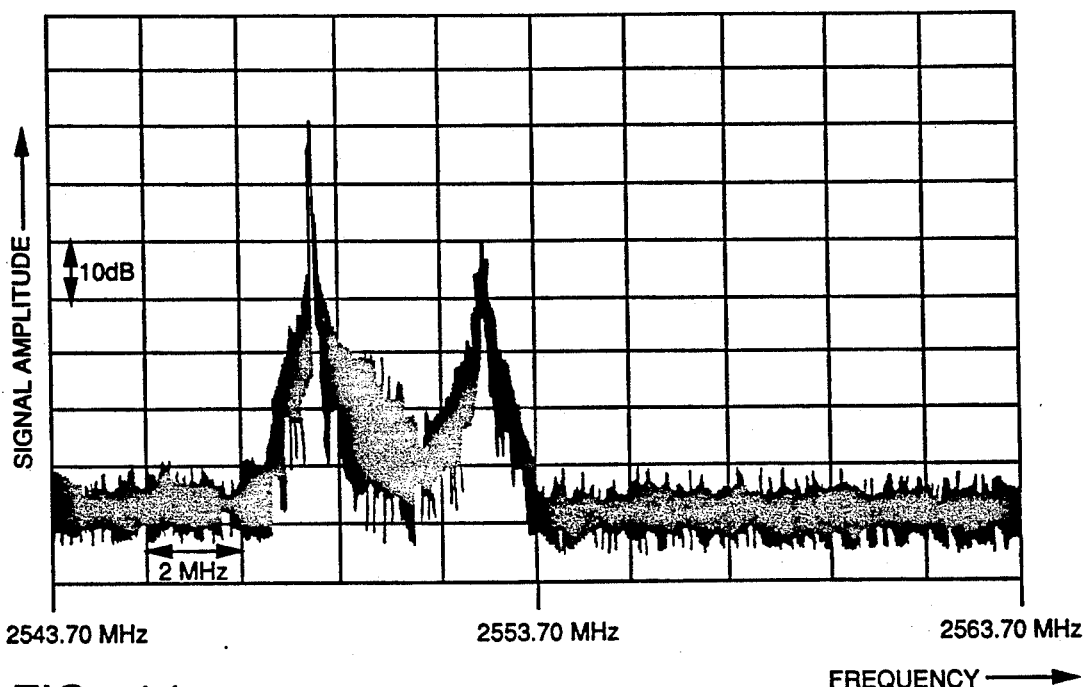
FIG. 14 is the spectrum response of the first channel visual output of the adjacent television channel combiner shown in FIG. 13.
Figure 15:
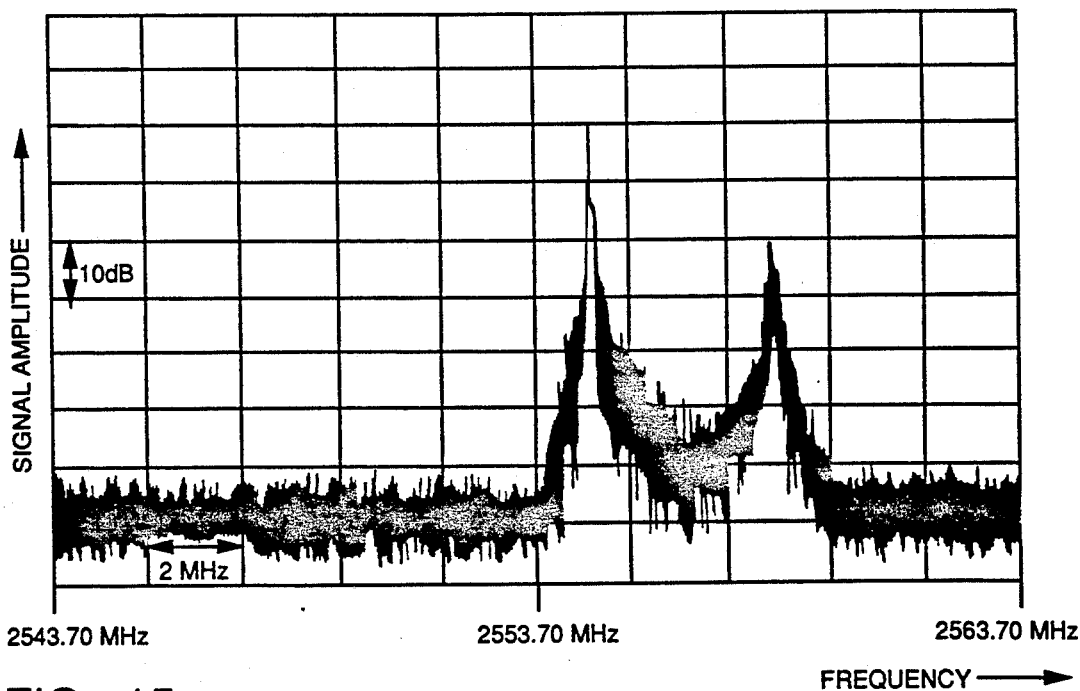
FIG. 15 is the spectrum response of the second channel visual output of the adjacent television channel combiner shown in FIG. 13.
Figure 16:
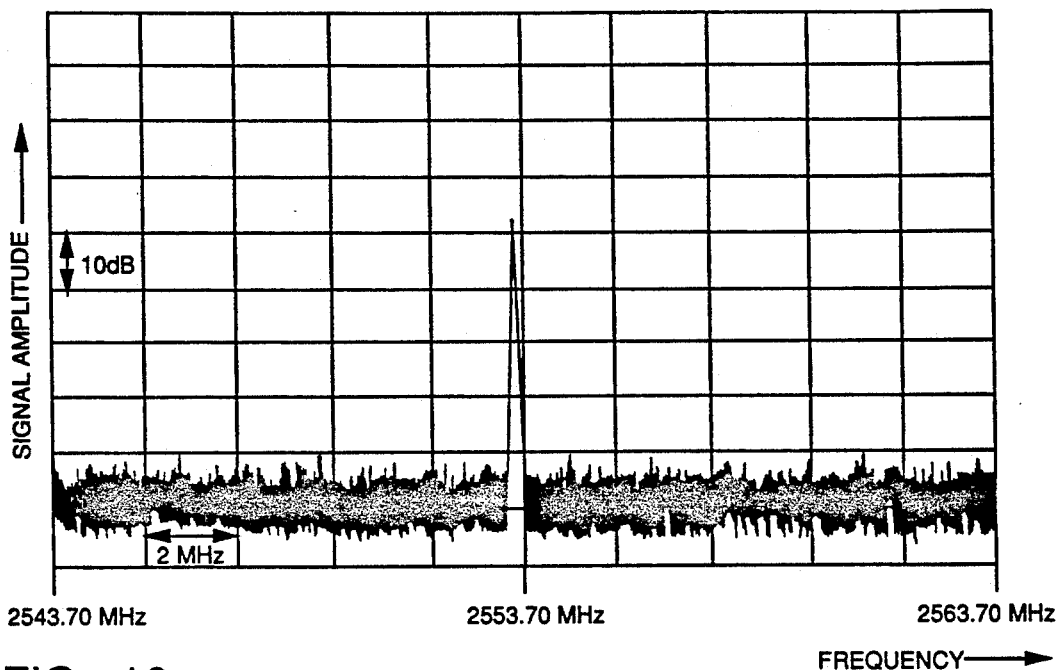
FIG. 16 is the spectrum response of the first channel aural output of the adjacent television channel combiner shown in FIG. 13.
Figure 17:
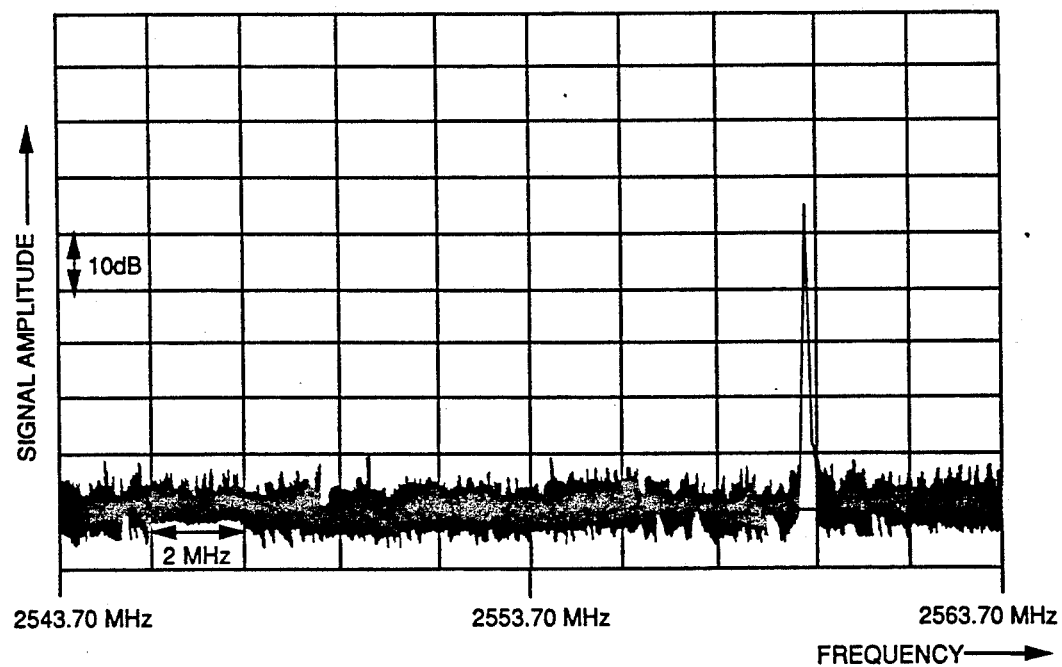
FIG. 17 is the spectrum response of the second channel aural output of the adjacent television channel combiner shown in FIG. 13.
Figure 18:
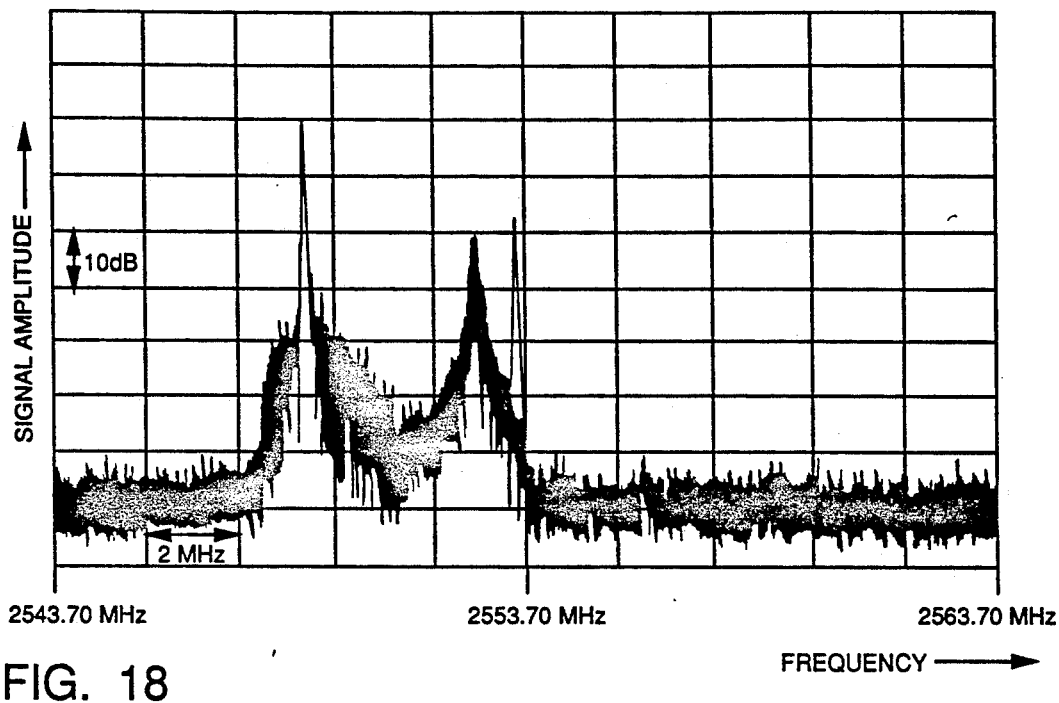
FIG. 18 is the spectrum response of the combined visual and aural outputs of the first channel of the adjacent channel television combiner shown in FIG. 13.
Figure 19:
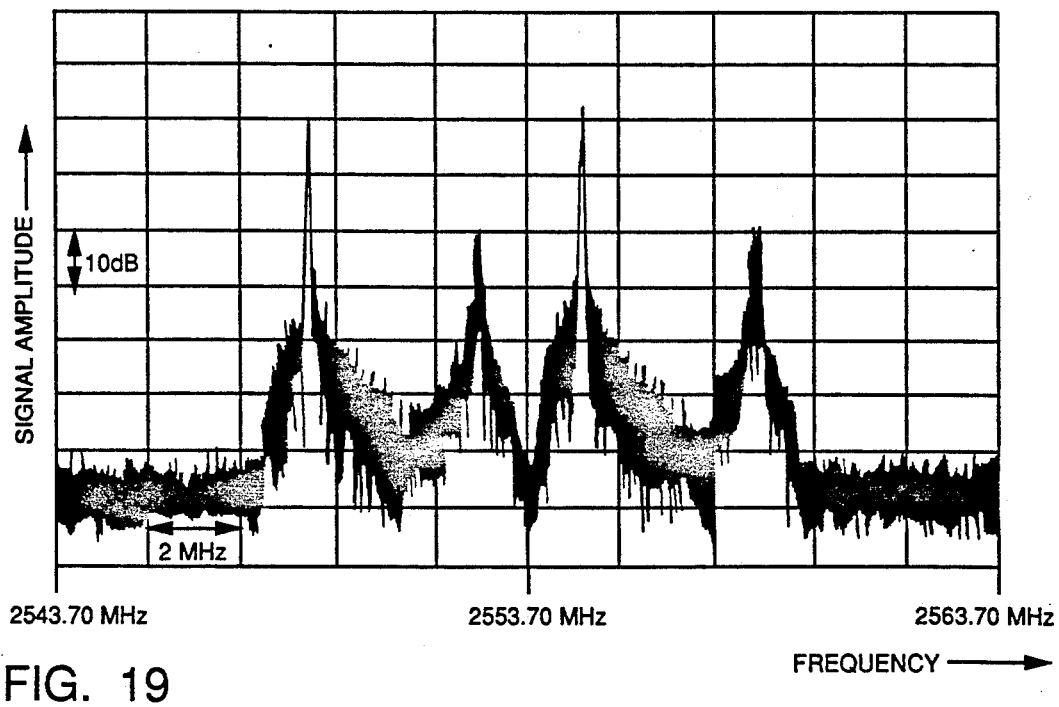
FIG. 19 is the spectrum response of the combined visual outputs of the first and second channels of the adjacent channel television combiner shown in FIG. 13.

The spectrum response of the television signals transmitted through the two channel combiner 30 are shown graphically in FIGS. 14-20. FIG. 14 shows the spectrum response of the visual signal of channel C1 transmitted through the combiner 30. FIG. 15 shows the spectrum response of the channel D1 visual signal transmitted through the combiner 30. FIG. 16 shows the spectrum response of the aural signal of channel C1 transmitted through the combiner 30. FIG. 17 shows the spectrum response of the aural signal of channel D1 transmitted through the combiner 30. FIG. 18 shows the spectrum response of the combined visual and aural signals for channel C1 transmitted through the combiner 30. FIG. 19 shows the spectrum response of the combined visual signals from channels C1 and D1 transmitted through the combiner 30. Finally, FIG. 20 shows the combined spectrum response of both the visual and aural signals of both channels C1 and D1 transmitted through the combiner 30 and, more importantly, shows that the present invention operates as intended. Referring to FIG. 19, one can clearly see the guard band between the adjacent visual signals in the area to the right of 2553.70 MHz. Since a frequency of 2554 MHz is the end of channel C1 and the beginning of channel D1, the small frequency space at the right of frequency 2553.70 MHz is a sufficient guard band to separate the visual signals of channels C1 and D1 from one another.

Having described above the presently preferred embodiments of this invention, it is to be understood that the invention may be otherwise embodied within the scope of the appended claims.

We claim:

1. A method of combining a plurality of immediately adjacent channel television signals, each of said channels including a visual signal and a separate aural signal, said method comprising the steps of:
   a. providing a main transmission line for transmitting said plurality of television signals in a predetermined direction of transmission;
   b. inserting the visual signal of a first television channel into said main transmission line in said predetermined direction;
   c. then inserting the visual signal of a second, immediately adjacent television channel into said main transmission line in said predetermined direction, using a frequency band otherwise occupied by the aural signal of the first television channel as a guard band to separate the combined visual signals of said first and second television channels;
   d. then inserting the aural signal of said first television channel into said main transmission line in said predetermined direction; and
   e. then inserting the aural signal of said second television channel into said main transmission line in said predetermined direction.

2. The method of claim 1 wherein said second television channel is the immediately adjacent television channel next higher in frequency than said first television channel.

3. The method of claim 2 wherein steps (b) and (c) are repeatedly performed, before steps (d) and (e) are performed, to sequentially insert into said transmission line in said predetermined direction the visual signals of further immediately adjacent television channels, using a frequency band otherwise occupied by the aural signal of an immediately adjacent and previously inserted television channel as a guard band to separate the visual signal of each said further television channel from the previously inserted television channel, and wherein steps (d) and (e) are then repeatedly performed to sequentially insert into said transmission line in said predetermined direction the aural signals of each of said further immediately adjacent television channels.

4. The method of claim 1 wherein said main transmission line is a length of main waveguide.

5. The method of claim 4 wherein said main waveguide is an elongated rectangular waveguide.

6. The method of claim 4 wherein said visual and aural signals are each inserted into said main waveguide by a directional filter connected thereto.

7. The method of claim 6 wherein said directional filters each include a cylindrical waveguide filter connected at one end to said main waveguide and a directional coupler connected to an opposite end of said cylindrical waveguide filter.

8. A method of combining a plurality of immediately adjacent channel television signals, each of said channels including a visual signal and a separate aural signal, said method comprising the steps of:
   a. providing a main transmission line for transmitting said plurality of television signals in a predetermined direction of transmission;
   b. inserting the visual signal of a first television channel into said main transmission line in said predetermined direction;
   c. then inserting the visual signal of a second, immediately adjacent television channel into said main transmission line in said predetermined direction, using a frequency band otherwise occupied by the aural signal of the first television channel as a guard band to separate the combined visual signals of said first and second television channels;

d. then sequentially inserting each visual signal of the remaining television channels into said main transmission line in said predetermined direction of transmission, using a frequency band otherwise occupied by the aural signal of an immediately adjacent and previously inserted television channel as a guard band to separate the visual signal of each remaining television channel from the previously inserted television channel;

e. then inserting the aural signal of said first television channel into said main transmission line in said predetermined direction;

f. then inserting the aural signal of said second television channel into said main transmission line in said predetermined direction; and g. then sequentially inserting each aural signal of the remaining television channels into said main transmission line in said predetermined direction of transmission.

9. The method of claim 8 wherein each said television channel is the adjacent television channel next higher in frequency than an immediately preceding television channel.

10. The method of claim 8 wherein said main transmission line is a length of main waveguide.

11. The method of claim 10 wherein said main waveguide is an elongated rectangular waveguide.

12. The method of claim 10 wherein said visual and aural signals are each inserted into said main waveguide by a directional filter connected thereto.

13. The method of claim 12 wherein said directional filters each include a cylindrical waveguide filter connected at one end to said main waveguide and a directional coupler connected to an opposite end of said cylindrical waveguide filter.

14. An apparatus for combining a plurality of immediately adjacent channel television signals, each of said channels including a visual signal and a separate aural signal, said apparatus comprising:

a. a main transmission line adapted to transmit a plurality of television signals therethrough in a predetermined direction of transmission;

b. a first visual directional filter connected to said main transmission line and adapted to transmit only the visual signal of a first television channel through said main transmission line in said predetermined direction of transmission;

c. a second visual directional filter connected to said main transmission line at a location immediately downstream of said first visual directional filter with respect to said predetermined direction of transmission, with said second visual directional filter adapted to transmit only the visual signal of a second television channel through said main transmission line in said predetermined direction of transmission, and with said second television channel being immediately adjacent to said first television signal;

d. a first aural directional filter connected to said main transmission line at a location downstream of said visual directional filters with respect to said predetermined direction of transmission, with said first aural directional filter adapted to transmit only the aural signal of said first television channel through said main transmission line in said predetermined direction of transmission; and e. a second aural directional filter connected to said main transmission line at a location downstream of said first aural directional filter with respect to said predetermined direction of transmission, with said second aural directional filter adapted to transmit only the aural signal of said second television channel through said main transmission line in said predetermined direction of transmission.

15. The apparatus of claim 14 wherein said second television channel is the immediately adjacent television channel next higher in frequency than said first television channel.

16. The apparatus of claim 14 wherein said main transmission line is a length of main waveguide.

17. The apparatus of claim 16 wherein said main waveguide is an elongated, rectangular waveguide.

18. The apparatus of claim 16 wherein each directional filter includes a cylindrical waveguide filter connected at one end to said main waveguide and a directional coupler connected to an opposite end of said cylindrical waveguide filter.

19. Apparatus for combining a plurality of immediately adjacent channel television signals, each of said channels including a visual signal and a separate aural signal, said apparatus comprising:

a. a main transmission line adapted to transmit a plurality of television signals therethrough in a predetermined direction of transmission;

b. a plurality of visual directional filters which are each connected to said main transmission line and are each adapted to transmit only the visual signal of a particular television channel through said main transmission line in said predetermined direction of transmission, with a first visual directional filter adapted to transmit only the visual signal of a first television channel, with a second visual directional filter positioned immediately downstream of said first visual directional filter with respect to said predetermined direction of transmission and adapted to transmit only the visual signal of a second television channel immediately adjacent to said first television channel, and with each remaining visual directional filter positioned immediately downstream of an immediately preceding visual directional filter and adapted to transmit only the visual signal of the next television channel immediately adjacent to the television channel associated with the immediately preceding visual directional filter; and c. a plurality of aural directional filters, equal in number to the plurality of visual directional filters, and which are each connected to said main transmission line at locations downstream of said plurality of visual directional filters and are each adapted to transmit only the aural signal of a particular television channel through said main transmission line in said predetermined direction of transmission, with a first aural directional filter adapted to transmit only the aural signal of said first television channel, with a second aural directional filter positioned immediately downstream of said first aural directional filter with respect to said predetermined direction of transmission and adapted to transmit only the aural signal of said second television channel, and with each remaining aural directional filter positioned immediately downstream of an immediately preceding aural directional filter and adapted to transmit only the aural signal of the next television channel immediately adjacent to the television channel associated with the immediately preceding aural directional filter.

20. The apparatus of claim 19 wherein each said television channel is the adjacent television channel next higher in frequency than an immediately preceding television channel.

21. The apparatus of claim 19 wherein said main transmission line is a length of main waveguide.

22. The apparatus of claim 21 wherein said main waveguide is an elongated, rectangular waveguide.

23. The apparatus of claim 21 wherein each directional filter includes a cylindrical waveguide filter connected at one end to said main waveguide and a directional coupler connected to an opposite end of said cylindrical waveguide filter.

24. The apparatus of claim 19 wherein said main transmission line includes a first main waveguide having each visual directional filters attached thereto and a second main waveguide connected to said first main waveguide and having each aural directional filter attached thereto.

25. The apparatus of claim 24 wherein said first main waveguide and said second main waveguide are each an elongated rectangular waveguide.

26. The apparatus of claim 25 wherein each visual directional filter includes a visual cylindrical waveguide filter connected at one end to said first main waveguide and a visual directional coupler connected at the other end of said visual cylindrical waveguide, and wherein each aural directional filter includes an aural cylindrical waveguide filter connected at one end to said second main waveguide and an aural directional coupler connected at an opposite end of said aural cylindrical waveguide filter.

* * * * *